United States Patent [19]
Colucci

[11] 3,848,121
[45] Nov. 12, 1974

[54] HEADLAMP FOR MOTOR VEHICLES
[75] Inventor: Ivo Colucci, Milan, Italy
[73] Assignee: Alfa Romeo S.p.A., Milan, Italy
[22] Filed: June 14, 1973
[21] Appl. No.: 370,057

[30] Foreign Application Priority Data
June 22, 1972 Italy .................................. 24046/72

[52] U.S. Cl. ..................... 240/41.6, 240/44, 240/57
[51] Int. Cl. ............................................. F21v 7/00
[58] Field of Search ...... 240/57, 41.6, 41.61, 41.62, 240/44

[56] References Cited
UNITED STATES PATENTS
2,911,522  11/1959  Mears ............................... 240/57 X
2,911,523  11/1959  Falge ................................ 240/57 X
3,546,445  12/1970  Marchant .......................... 240/41.6

Primary Examiner—Monroe H. Hayes
Attorney, Agent, or Firm—Waters, Roditi, Schwartz & Nissen

[57] ABSTRACT

An orientable headlamp for motor vehicles wherein a first supporting member is located at the point of intersection of two orthogonal axes and is in a spatially fixed position, a second supporting member is screwably affixed into a fixed seating for the headlamp substantially parallel to the direction of the light beam, rotation of the lamp body about the second directional axis serving to adjust the position of the headlamp, and a third supporting member, a slider, is slidable in a direction which is parallel to the direction of the light rays, the slider being capable of being set in at least two positions remote from one another. It is thus possible, for example, to adjust the position of the headlamp consistently with variation of the vehicle load.

8 Claims, 5 Drawing Figures

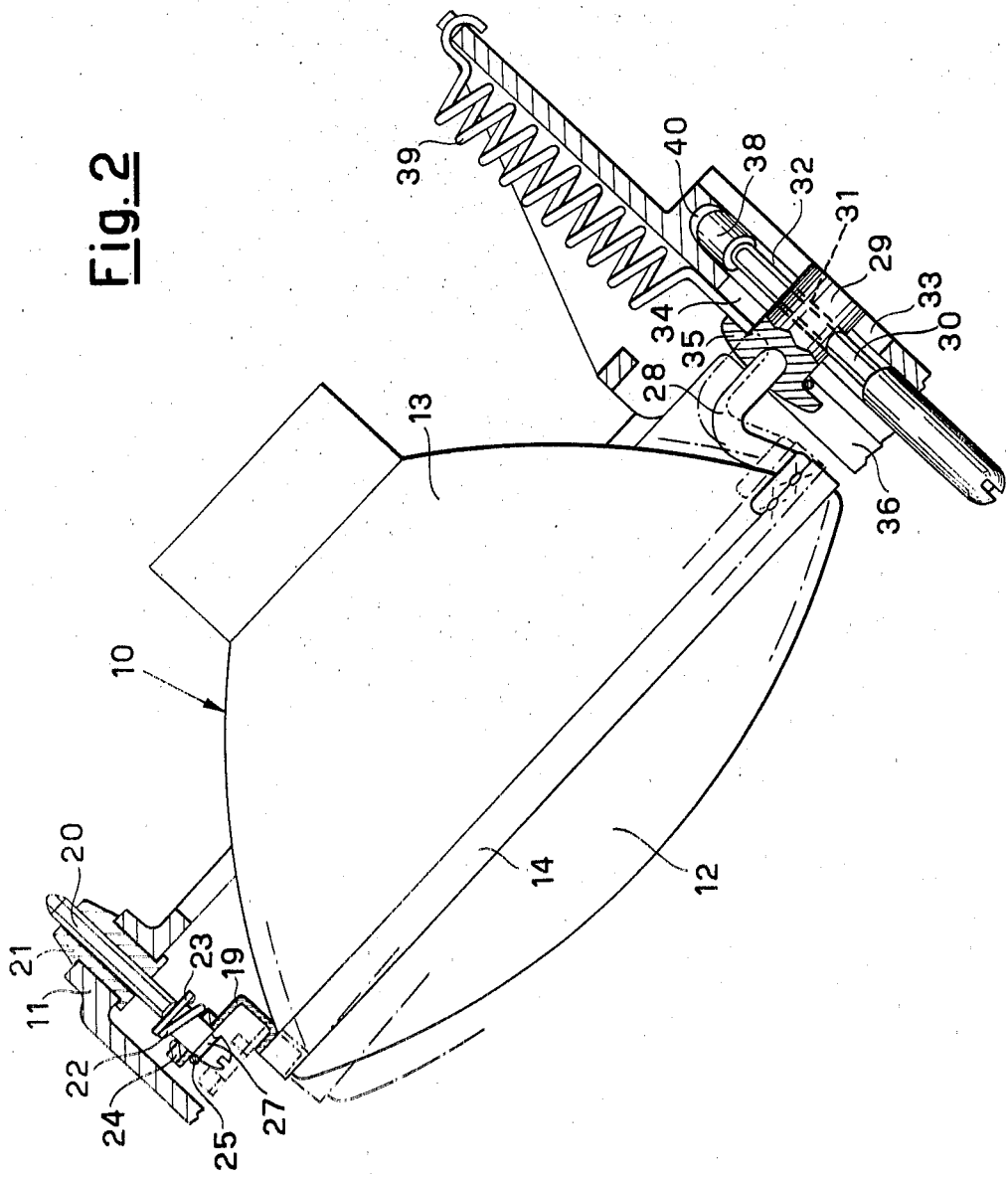

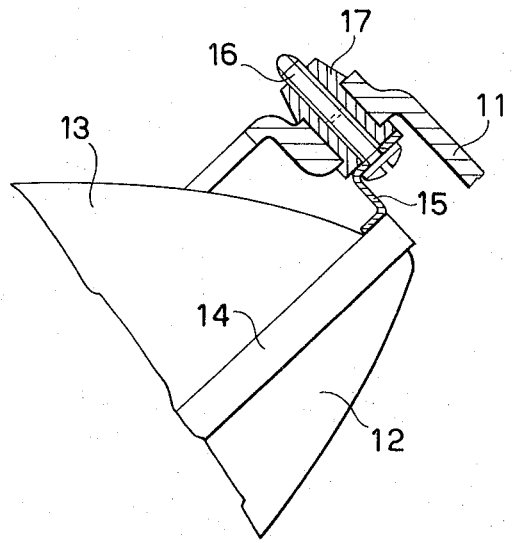
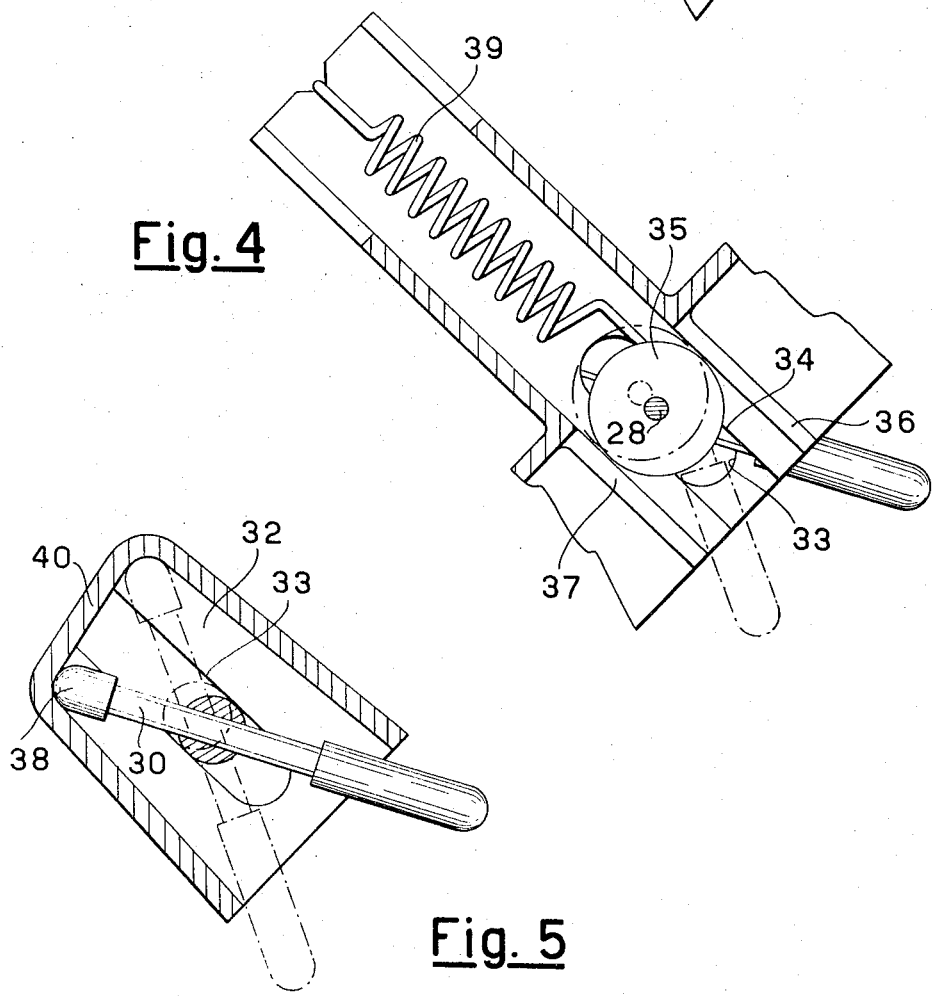

HEADLAMP FOR MOTOR VEHICLES

This invention relates to a headlamp for motor vehicles equipped with members for affixing it to the car body while permitting the position of the headlamp to be varied with respect to its seating by manual operations.

It is known that the direction of the beam of light from the headlamp must fall within exacting specifications; it is thus necessary to be able to carry out an adjustment whenever assemblage allowances or accidents, during the car service life, modify the orientation of the headlamps. To adjust the position of the headlamp in its seating, it should be possible to rotate the headlamp about two orthogonal axes, one vertical and the other horizontal, these axes being coincident with those of the headlamp or parallel thereto.

This type of adjustment is usually carried out by manipulating members which support the headlamp on the car body, these members conventionally being screws which can be screwed more or less deeply in the relative seats.

It is well known, however, that, as a rule, the car undergoes considerable variations of its attitude as a function of its load, the result being an alteration of the headlamp orientation. It has been suggested to combine the basic headlamp orientation, to be carried out on assemblage, with a manual adjustment, to be carried out very easily, to allow for a variation of the vehicle load. Such a manual adjustment is sufficient if it provides for relative rotation of the headlamp about its horizontal axis, so as to restore the original angle of the light beam.

An object of the present invention is to provide a headlamp which is secured to its casing and permits both the adjustments enumerated above.

In addition, the manual adjustment according to the invention requires an extremely simple mechanism, holds the headlamp very sturdily in position and prevents undue vibrations.

According to the invention there is provided a headlamp for motor vehicles which is manually orientable, in which the light source is supported on a fixed seating by means of three universal supporting members lying in a plane which is substantially orthogonal to the direction of the emission of light from the source, a first and a second of the supporting members being aligned along a first axis, the first and third of the supporting members being aligned along a second axis perpendicular to the first the characterized in that the first supporting member is situated on the point of intersection of said axes and is fixed, the second supporting member consisting of a member which is screwably affixed into said fixed seating in a direction which is substantially parallel to the direction of emission of the light, so as to adjust the position of said body by rotation about said second axis, the third of said supporting members consisting of a sliding member which slides controllably on said seating in a direction substantially parallel to the direction of emission of the light, means being provided for holding said sliding member in at least two positions remote from one another.

The features and characteristics of the invention will be better understood from the ensuing description of one embodiment of the headlamp according to the invention, as shown by way of example only and without limitation, in the accompanying drawings, wherein:

FIG. 2 is a cross-sectional view taken along line II—II in FIG. 1.

FIG. 3 is a fragmentary view taken along line III—III in FIG. 1.

FIG. 4 is a cross-sectional view taken along line IV—IV in FIG. 1.

FIG. 5 is a cross-sectional view taken along line V—V in FIG. 1.

Figure 1:
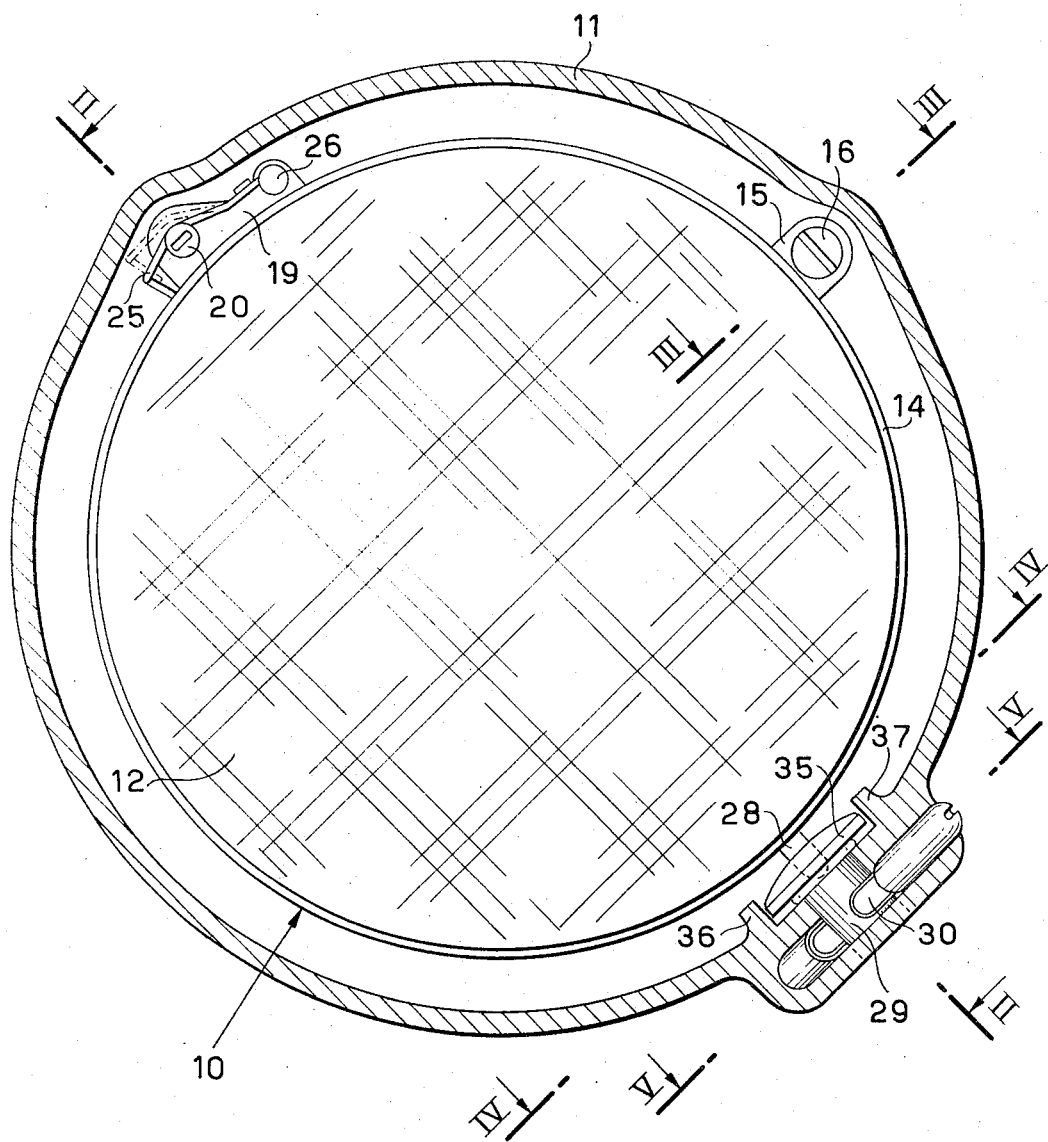
FIG. 1 shows a headlamp according to the invention in front view.

The numeral 10 generally indicates a headlamp comprising a reflector 13, enclosed by a glass cover 12 and containing a light source (not shown), the headlamp being adapted to be fixed on a seat 11 for the headlamp located at the front (not shown) of a motor vehicle. The reflector 13 of the headlamp is terminated by a rim 14 which is integral with a bracket 15, best seen in FIG. 3. At 16 there is shown a set screw engaged with the bracket 15 and with a plug 17, the latter being snugly fitted in the bottom wall of the seat 11.

At 19 there is shown a second bracket which is also integral with the rim 14 as shown in FIG. 2.

At 20 there is shown an adjustment screw engaged with the bracket 19 and a plug 21, snugly fitted into the bottom wall of the seat 11.

At 22 there is shown a small spring inserted between a cup 23 integral with the screw 20 and a washer 24. A small wire spring clip 25, affixed to the bracket 19 at 26 is resiliently housed in a groove 27 formed in the head of the screw 20, thus fastening the bracket and the screw 20, the latter being left free to rotate, the spring clip 25 being displaceable towards the position shown in dotted lines in FIG. 1 so that it becomes possible to release the bracket from the screw (position in dotted lines in FIG. 2) and to remove the headlamp for repair operations without modifying the position of the adjustment screw 20.

The rim 14 is also integral with a pin having somewhat the shape of an L as indicated at 28. The partially spherical end of said pin is housed in a corresponding hollow space as formed in a cylinder 29.

There is shown at 30 a rod which is screwthreaded along a substantial portion of its length, which is screwed into a bore 31 in the cylinder 29.

At 32 there is shown a hollow space formed in the seat 11 in which the rod 30 is partially inserted: In the confronting walls of the hollow space 32 there are formed slots 33 and 34, in which the cylinder 29 is slidably guided, whereas a cup 35, integral with the cylinder 29, is guided by ridges 36 and 37 of the wall of the seat 11, as clearly shown in FIG. 4.

The rod 30 has, at one end, a cap 38 which can slide on the bottom wall 40 of the hollow space 32, as a result of the rotation of the rod 30 through the agency of the pin 29.

A recoil spring 39, hooked to the seat 11 and to the cylinder 29, maintains the cap 38 in constant contact with the wall 40.

The adjustment of the position of the headlamp in the casing 11 in order to obtain a direction of the beam of light in accordance to the specifications can be performed through the agency of the adjusting screw 20 and the screw-threaded rod 30, while the screw 16 always remains fixed upon assemblage.

By acting upon the screw 20, the headlamp is caused to rotate about an axis which is substantially parallel to the vertical axis of the headlamp and passes through the set screw 16 and the hemispherical end of the pin 28; by acting upon the rod 30, i.e., by turning the rod about its longitudinal axis, the headlamp is caused to rotate about an axis which is substantially parallel to the transversal axis of the headlamp and passes through the adjustment screw 20 and through the set screw 16: a moderate flexibility of the plate 15 makes correct orientation of the headlamp possible.

As outlined above, it is also necessary to adjust the position of the headlamps as the vehicle load is varied.

This is achieved by means of the rod 30 which emerges from the hollow space 32 by an amount which is just enough efficiently to manipulate the rod and to shift it between the two end positions which correspond to the minimum load position and the maximum load position, respectively. In FIG. 5 there is shown in solid lines the rod 30 in the former position and, in phantom, the rod in the latter position.

Under the action of a moderate pressure from outside, the rod 30 is rotated about the axis of the cylinder 29 and is rotated, while the cap 38 follows the outline of the bottom wall 40 of the hollow space 32, concurrently with the sliding of cylinder in the slots 33 and 34 by the acting of the spring 39.

In the example shown, the rod 30 has two stable positions, in which its end 38 rests against the two ends of the surface 40 which serve as abutments therefor; it is obvious that the slope of the surface 40 relative to the axis of the slots 33 and 34 defines the magnitude of the sliding movement of the pin 29 therealong: this slope can thus be designed so that the two end positions of the rod 30 correspond to a correct orientation of the headlamps with the vehicle at its minimum and maximum load, respectively.

The embodiment as described hereinabove and shown in the accompanying drawings is merely exemplary and is susceptible of any appropriate constructional changes which may be suggested to those skilled in the art as necessity demands.

What is claimed is:

1. Apparatus for supporting a headlamp in a seating of a motor vehicle to enable manual adjustment of the position of the headlamp, said apparatus comprising three support means connecting the headlamp to the seating, said three support means being positioned at the apices of a triangle which lies in a plane substantially perpendicular to the light beam from the headlamp, a first and second of said support means being on one side of said triangle which is substantially horizontal, the first and third of said support means being on a second side of said triangle which is substantially vertical, said first support means comprising a mounting member securing the headlamp to the seating such that the headlamp is pivotable thereat, said second mounting means comprising an aiming screw adjustably connecting the headlamp to the seating to pivotably displace the headlamp about said vertical side of said triangle, said third mounting means comprising a threaded member engaging said headlamp and displaceable in opposite directions to rotate the headlamp about said horizontal side of said triangle, actuator means threadably engaging said threaded member to move the same in either of said opposite directions by turning said actuator means, and means supporting said actuator means for displacement between first and second positions to carry said threaded member therewith and produce rotation of the headlamp about said horizontal side of the triangle, said first and second positions corresponding to two respective predetermined load conditions of the motor vehicle.

2. Apparatus as claimed in claim 1 wherein said mounting member of the first support means comprises a set screw.

3. Apparatus as claimed in claim 1 wherein said actuator means comprises a rod with a threaded portion engaging said threaded member.

4. Apparatus as claimed in claim 3 wherein said means supporting the actuator means comprises a housing in which said rod is displaceable between said first and second positions.

5. Apparatus as claimed in claim 4 wherein said housing guidably supports said threaded member for linear displacement in said opposite directions.

6. Apparatus as claimed in claim 5 wherein said rod has an end in slidable abutment with said housing, and comprising a spring acting on said threaded member and urging said end of the rod against said housing.

7. Apparatus as claimed in claim 6 wherein said housing has end walls serving as limiting abutments for said rod in said first and second positions.

8. Apparatus as claimed in claim 7 comprising a pin member securing said threaded member to said headlamp.

* * * * *